(12) United States Patent
D'Arcy et al.

(10) Patent No.: US 11,499,788 B2
(45) Date of Patent: Nov. 15, 2022

(54) PASSIVE SPLIT HEAT RECOVERY SYSTEM

(71) Applicant: HEAT-PIPE TECHNOLOGY, INC., Tampa, FL (US)

(72) Inventors: Marcus D'Arcy, Spring Hill, FL (US); Onieluan Tamunobere, Tampa, FL (US)

(73) Assignee: HEAT-PIPE TECHNOLOGY, INC., Tampa, FL (US)

(*) Notice: Subject to any disclaimer, the term of this patent is extended or adjusted under 35 U.S.C. 154(b) by 96 days.

(21) Appl. No.: 17/215,584

(22) Filed: Mar. 29, 2021

(65) Prior Publication Data

US 2021/0215436 A1    Jul. 15, 2021

Related U.S. Application Data (62) Division of application No. 16/290,455, filed on Mar. 1, 2019, now Pat. No. 10,962,303.

(51) Int. Cl.
| F28F 27/00 | (2006.01) |
| F28D 15/06 | (2006.01) |
| F28D 15/02 | (2006.01) |

(52) U.S. Cl.
CPC ......... *F28D 15/06* (2013.01); *F28D 15/0266* (2013.01)

(58) Field of Classification Search
CPC .............................. F28D 15/06; F28D 15/0266
USPC ........................................................ 165/96
See application file for complete search history.

(56) References Cited

U.S. PATENT DOCUMENTS

| 3,926,249 | A | 12/1975 | Glancy |
| 4,190,102 | A | 2/1980 | Gerz |
| 4,226,282 | A | 10/1980 | Kunsagi |
| 4,299,272 | A | 11/1981 | Del Bagno, Sr. |
| 4,333,517 | A | 6/1982 | Parro |
| 4,827,733 | A * | 5/1989 | Dinh ............... F24F 6/02 62/196.3 |
| 4,938,035 | A | 7/1990 | Dinh |
| 5,265,433 | A | 11/1993 | Beckwith |
| 5,346,127 | A | 9/1994 | Creighton |
| 5,695,004 | A | 12/1997 | Beckwith |
| 6,745,830 | B2 | 6/2004 | Dinh |

(Continued)

FOREIGN PATENT DOCUMENTS

| JP | 56110886 A | 9/1981 |
| JP | S60251334 A | 12/1985 |
| JP | 61165549 A | 7/1986 |

OTHER PUBLICATIONS

Office Action dated Sep. 3, 2020 U.S. Appl. No. 15/952,758, 12 pages.

(Continued)

*Primary Examiner* — Davis D Hwu
(74) *Attorney, Agent, or Firm* — Levenfeld Pearlstein, LLC (57) ABSTRACT

A heat pipe heat exchanger is used in combination with a damper assembly to selectively control an amount of heat exchange provided. A divider defines discrete heat pipe plenums and bypass plenums within a duct, and the heat pipe system is configured so that all of the coils of one portion of the heat pipe system are received in the heat pipe plenum(s), while the bypass plenum(s) are free of any coils. The damper assembly includes adjustable heat pipe dampers aligned with the heat pipe plenums and adjustable bypass dampers aligned with the bypass plenums.

10 Claims, 5 Drawing Sheets

(56) References Cited

U.S. PATENT DOCUMENTS

| | | |
|---|---|---|
| 8,033,322 B1 | 10/2011 | Trent |
| 9,664,409 B2 | 5/2017 | Marak |
| 9,702,634 B1 | 7/2017 | Mankaruse |
| 9,772,124 B2 | 9/2017 | Wintemute |
| 10,473,343 B2 | 11/2019 | Goel |
| 2012/0186787 A1 | 7/2012 | Dinh |
| 2012/0298334 A1 | 11/2012 | Madaffari et al. |
| 2015/0168985 A1 | 6/2015 | Du et al. |
| 2016/0201937 A1 | 7/2016 | Park et al. |

OTHER PUBLICATIONS

Innergy Tech, Inc., Controllable Heat Pipes, the Easy Way, Innergy tech technical library, document HP-T5.0_A, 2008, 1 page, Canada.
Office Action dated Oct. 1, 2020 U.S. Appl. No. 16/290,455, 9 pages.

* cited by examiner

FIG. 7

PASSIVE SPLIT HEAT RECOVERY SYSTEM

CROSS-REFERENCE TO RELATED APPLICATION

This application is a divisional application of U.S. application Ser. No. 16/290,455, which was filed Mar. 1, 2019, and which is incorporated herein by reference in its entirety for all purposes.

FIELD

This disclosure generally relates to a heat pipe heat exchanger for use in a ventilation system.

BACKGROUND

Heat exchangers can be used in ventilation systems to transfer heat between warm and cool air streams. For example, a heat exchanger can be used to provide heat recovery between warm and cool air streams flowing through two different ducts (e.g., exhaust and supply) in a ventilation system. In another example, a heat exchanger can be used to exchange heat between warm and cold portions of an air stream flowing through a single duct. For example, a single wraparound heat exchanger can provide pre-cooling at a location upstream of a cooling element and reheating at a location downstream of the cooling element.

Passive heat exchangers such as heat pipe systems are not typically controlled in a fine-tuned manner to adjust the amount of heat exchange provided. Rather, when a ventilation system is designed, the passive characteristics of a heat pipe system are chosen to provide the desired amount of heat exchange for a system. In the case of a wraparound heat pipe system, it can be desirable to design the system to have passive heat exchange characteristics that are excessive under certain uncommon conditions so that the heat pipe system may provide greater heat exchange during typical operating conditions. A passive wraparound heat pipe system can therefore provide excessive reheat under certain conditions. To avoid excessive reheating, manufacturers have attempted to selectively reduce the heat exchange capacity of the system by fitting shutoff valves that selectively restrict refrigerant flow through the heat pipe system. In addition, manufacturers have installed bypass dampers, which can selectively direct some of the air flowing through the ventilation system to bypass the reheat portion of the heat pipe system.

SUMMARY

In one aspect, a heat exchanger for exchanging heat between a first duct portion and a second duct portion in a ventilation system generally comprises a divider that is configured to be installed in the ventilation system in the first duct portion to divide the first duct portion into at least one heat pipe plenum and at least one bypass plenum. A heat pipe system comprises a refrigerant. The heat pipe system includes a first heat pipe portion and a second heat pipe portion. The second heat pipe portion is fluidly connected to the first heat pipe portion such that the refrigerant can flow through the heat pipe system between the first heat pipe portion and the second heat pipe portion. The first heat pipe portion is configured to be installed in the first duct portion so that at least one heat pipe segment of the first heat pipe portion is located in the heat pipe plenum such that heat is transferrable between the first heat pipe portion and air flowing through the heat pipe plenum. The bypass plenum is free of any heat pipe segment of the heat pipe system. The condenser portion is configured to be installed in the second duct portion such that heat is transferrable between the second heat pipe portion and air flowing through the second duct portion. A damper assembly is configured to be mounted across the first duct portion and is selectively adjustable between a heat exchange configuration in which the damper assembly permits air flow through the heat pipe plenum and restricts air flow through the bypass plenum and a bypass configuration in which the damper assembly restricts air flow through the heat pipe plenum and permits air flow through the bypass plenum. The damper assembly comprises a single actuator configured to adjust the damper assembly between the heat exchange configuration and the bypass configuration.

In another aspect, a heat exchanger for exchanging heat between first and second duct portions of a ventilation system generally comprises a divider that is configured to be installed in the ventilation system in the first duct portion to divide the first duct portion into at least a first heat pipe plenum, a second heat pipe plenum, and a bypass plenum. A heat pipe system comprises a refrigerant. The heat pipe system includes a first heat pipe portion and a second heat pipe portion that is configured to be fluidly connected to the first heat pipe portion such that the refrigerant can flow through the heat pipe system between the first heat pipe portion and the second heat pipe portion. The first heat pipe portion is configured to be installed in the ventilation system so that at least one heat pipe segment of the first heat pipe portion is located in each of the first and second heat pipe plenums such that heat is transferrable between the first heat pipe portion and air flowing through the first and second heat pipe plenums. The bypass plenum is free of any heat pipe segments of the heat pipe system. The second heat pipe portion is configured to be installed in the ventilation system such that heat is transferrable between the second heat pipe portion and air flowing through the second duct portion. A damper assembly is configured to be mounted across the first duct portion and configured to be selectively adjusted between a heat exchange configuration in which the damper assembly permits air flow through the first and second heat pipe plenums and restricts air flow through the bypass plenum and a bypass configuration in which the damper assembly permits air flow through the bypass plenum and restricts air flow through the first and second heat pipe plenums. The bypass plenum is located between the first and second heat pipe plenums.

A damper assembly configured to be mounted in a duct of a ventilation system across a portion of a heat pipe system located in the duct generally comprises a frame extending in a damper assembly plane. The frame has an interior and at least one divider separating a heat pipe section of the interior from a bypass section of the interior. The frame is configured to be installed in the ventilation system such that the heat pipe section is aligned with a section of the duct in which one or more heat pipe segments of the heat pipe system are received and the bypass section is aligned with a section of the duct that is free of heat pipe segments. At least one heat pipe louver is rotatably mounted on the frame. Each heat pipe louver is rotatable with respect to the frame about a heat pipe louver rotational axis oriented generally parallel to the damper assembly plane between a closed position in which the heat pipe louver blocks air flow through the heat pipe section of the interior of the frame and an open position in which the heat pipe louver permits air flow through the heat pipe section of the interior of the frame. At least one bypass louver is rotatably mounted on the frame. Each bypass louver is rotatable with respect to the frame about a bypass louver rotational axis oriented generally parallel to the damper assembly plane between a closed position in which the bypass louver blocks air flow through the bypass section of the interior of the frame and an open position in which the bypass louver permits air flow through the bypass section of the interior of the frame. An actuation mechanism comprises a single actuator that is operably connected to each heat pipe louver and each bypass louver. The single actuator is configured to perform a first actuation operation in which the actuator adjusts the damper assembly from a heat exchange configuration to a bypass configuration and a second actuation operation in which the actuator adjusts the damper assembly from the bypass configuration to the heat exchange configuration. By the first actuation operation, the single actuator is configured to simultaneously rotate each heat pipe louver about the respective heat pipe louver rotational axis from the open position to the closed position and rotate each bypass louver about the respective bypass louver rotational axis from the closed position to the open position. By the second actuation operation, the single actuator is configured to simultaneously rotate each heat pipe louver about the respective heat pipe louver rotational axis from the closed position to the open position and rotate each bypass louver about the respective bypass louver rotational axis from the open position to the closed position.

Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
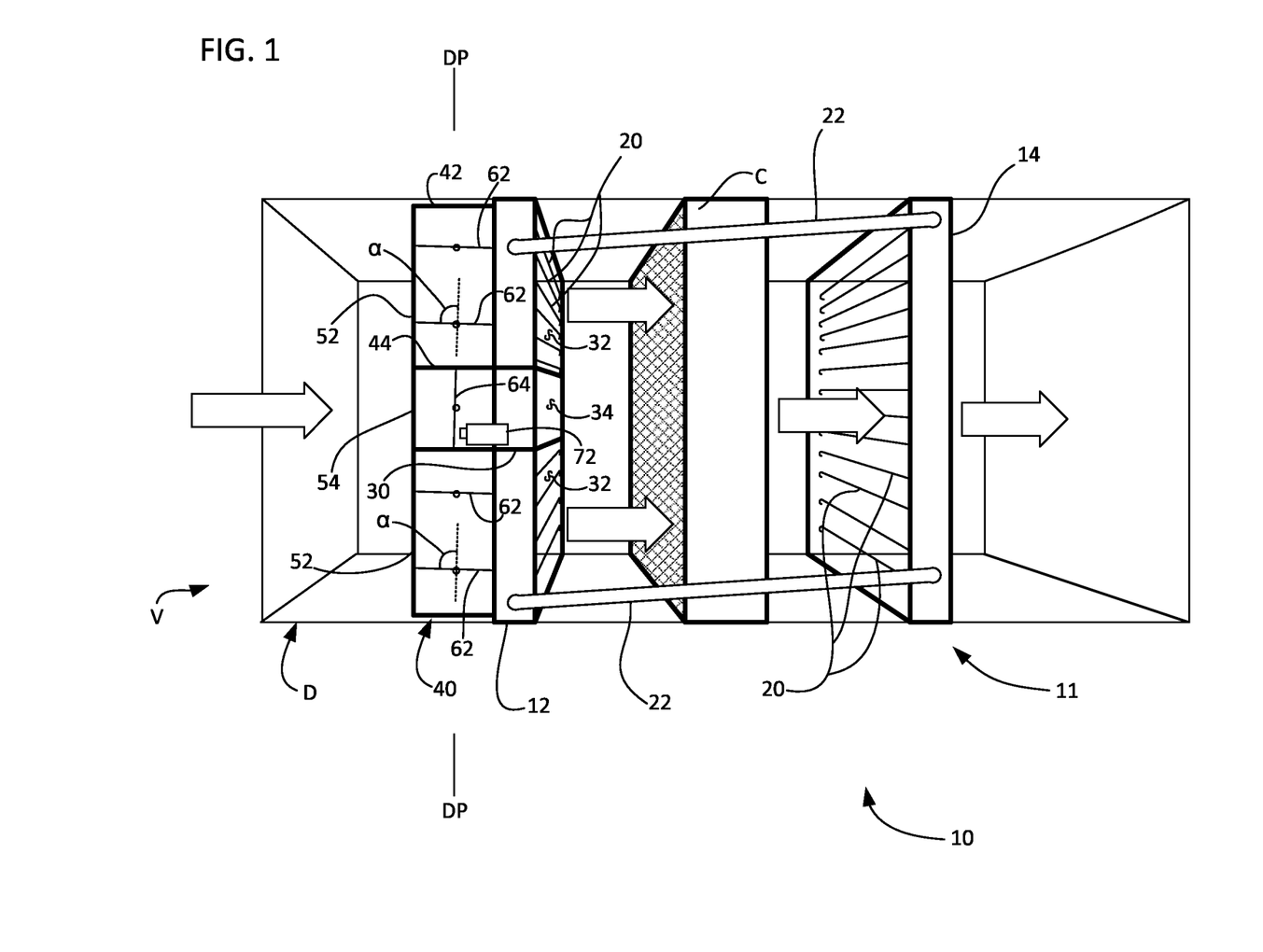
FIG. 1 is a schematic illustration of a wraparound heat exchanger installed in a ventilation system, showing a damper assembly thereof in a heat exchange configuration.
Figure 2:
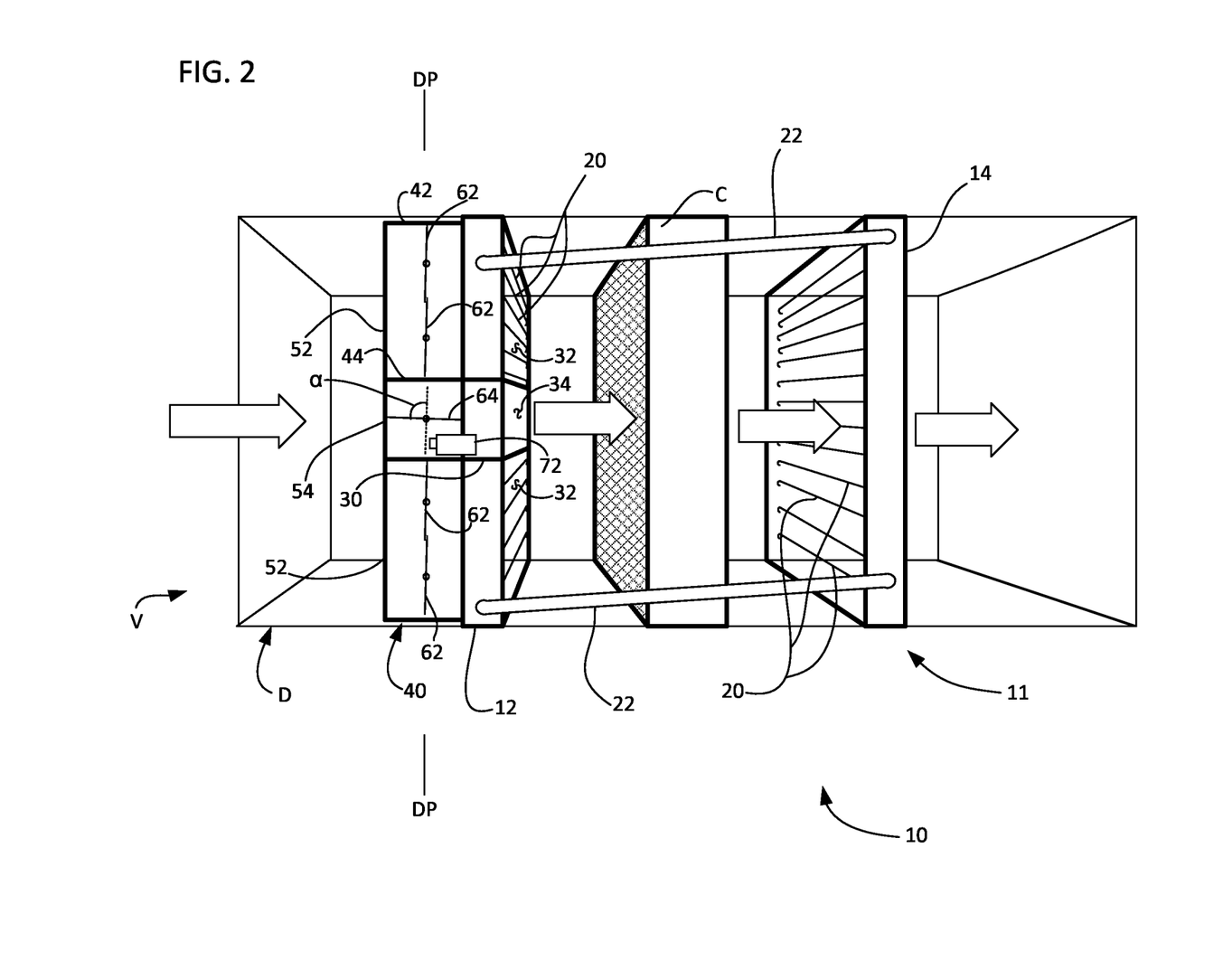
FIG. 2 is a schematic illustration similar to FIG. 1, but the damper assembly is shown in a bypass configuration.

Referring to FIGS. 1 and 2, one embodiment of a heat exchanger is generally indicated at reference number 10. The heat exchanger 10 comprises a heat pipe system 11 that is generally configured to exchange heat between warm and cool air streams in a ventilation system V of a forced air climate control system. As will be appreciated by those skilled in the art, the heat pipe system 11 generally comprises one or more thermally conductive tubes charged with refrigerant such that the heat pipe system is configured to transfer heat between warm and cool air streams by the refrigerant cyclically changing phase from vapor to liquid and back to vapor.

The illustrated heat exchanger 10 comprises a wraparound heat pipe heat exchanger. The heat exchanger 10 comprises an evaporator heat pipe portion 12 (broadly, a first heat pipe portion) installed in an upstream portion of a supply duct D (broadly, a first duct portion) and a condenser heat pipe portion 14 (broadly, a second heat pipe portion) installed in a downstream portion of the supply duct (broadly, a second duct portion). The evaporator portion 12 is located upstream of a cooling element C (e.g., cooling coils) of the ventilation system V, and the condenser portion 14 is located downstream of the cooling element. The evaporator portion 12 is configured to pre-cool warm air before it is cooled by the cooling element C and the condenser portion 14 is configured to reheat the cooled air to remove humidity.

As will be explained in further detail below, a damper assembly 40 is installed in the ventilation system V to selectively adjust the heat exchanger 10 between a heat exchange configuration (FIG. 1) and a bypass configuration (FIG. 2). The bypass configuration can be used, for example, to prevent the heat exchanger 10 from excessively reheating the cooled air stream. Although the illustrated damper assembly 40 is used in a wraparound heat pipe heat exchanger 10, damper assemblies configured in accordance with aspects of the present disclosure can also be used with other types of heat pipe heat exchangers in other embodiments.

Each of the heat pipe portions 12, 14 comprises a plurality of heat pipe segments 20 received in the respective one of the upstream and downstream portions of the duct D. The heat pipe segments 20 comprise elongate conductive tubes (e.g., copper tubes) that are arranged in generally parallel, spaced apart relation in the respective portion of the duct D. In the illustrated embodiment, the heat pipe segments 20 extend in generally horizontal directions, but in other embodiments the heat pipe segments could extend in other directions such as vertically (see the heat pipe segments 220 shown in FIGS. 7 and 8, for example). Embodiments of a wraparound heat pipe system having vertical heat pipe segments are described more fully in U.S. Pat. No. 5,695,004, which is hereby incorporated by reference in its entirety. In general, the heat pipe segments 20 are configured to transfer heat between the air flowing through duct and the refrigerant contained in the heat pipe system 11. Suitably, the heat pipe segments 20 can be thermally coupled to conductive fins (not shown). The conductive fins enhance heat transfer from the air stream to the heat pipe segments 20.

Two or more connecting tubes 22 fluidly connect the heat pipe segments 20 of the evaporator portion 12 to the heat pipe segments of the condenser portion 14 such that refrigerant can flow between the evaporator portion and the condenser portion. As will be appreciated by those skilled in the art, when the heat pipe system 11 is operating to provide heat exchange between the upstream and downstream portions of the duct D, the heat is transferred from the warm air entering the duct to the heat pipe segments 20 of the evaporator portion 12, thereby evaporating the liquid refrigerant in the evaporator portion. The vaporized refrigerant flows through the connecting tubes 22 to the heat pipe segments 20 of the condenser portion 14. There, heat from the warm refrigerant vapor is transferred to cool air discharged from the cooling element C, thereby condensing the refrigerant. The condensed liquid refrigerant flows from the condenser portion 14 through the connecting tubes 22 back to the evaporator portion 12.

In the illustrated embodiment, the evaporator heat pipe portion 12 comprises a divider 30 (e.g., a sheet metal partition or a smaller duct within the ventilation system duct D) that divides the duct into separate plenums including at least one heat pipe plenum 32 and at least one bypass plenum 34. In one or more embodiments, the condenser portion 14 can include such a divider in lieu of or in addition to the divider 30 of the evaporator portion 12. The illustrated divider 30 divides the upstream portion of the duct D into three plenums: upper and lower heat pipe plenums 32 (broadly, first and second heat pipe plenums) and a single bypass plenum 34 located between the upper and lower heat pipe plenums. The upper heat pipe plenum 32 is located above the bypass plenum 34, and the lower heat pipe plenum is located below the bypass plenum. In one or more embodiments, the divider 30 includes an upper impermeable partition wall (e.g., a first impermeable partition wall) extending between opposite sides of the duct and a parallel lower impermeable partition wall (e.g., a second impermeable partition wall) extending between opposite sides of the duct at a location spaced apart from the upper partition wall. In general the divider 30 is configured to prevent air that is flowing through one of the plenums 32, 34 from passing through a partition wall to an adjacent plenum.

Figure 3:
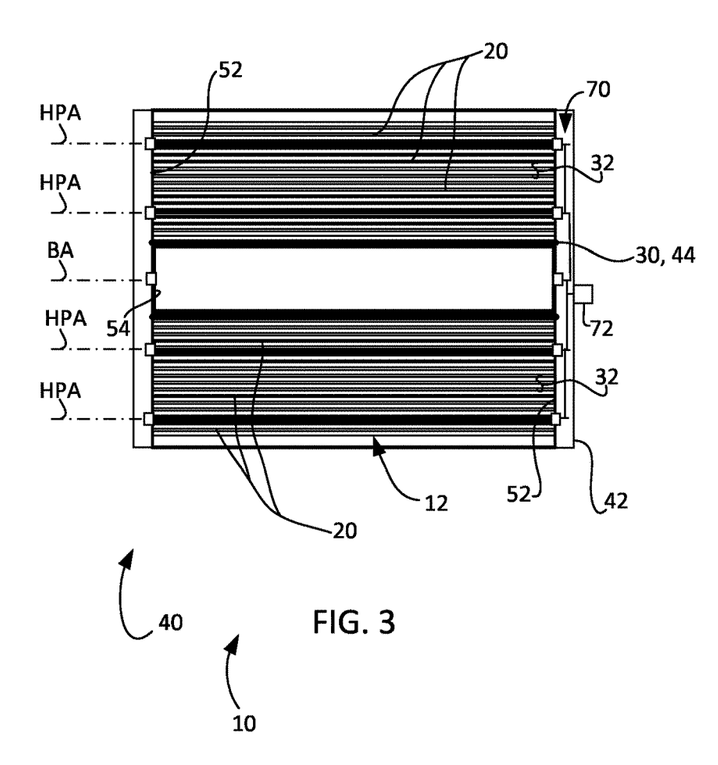
FIG. 3 is a schematic elevation of an upstream end of the wraparound heat exchanger showing the damper assembly in the heat exchange configuration.
Figure 4:
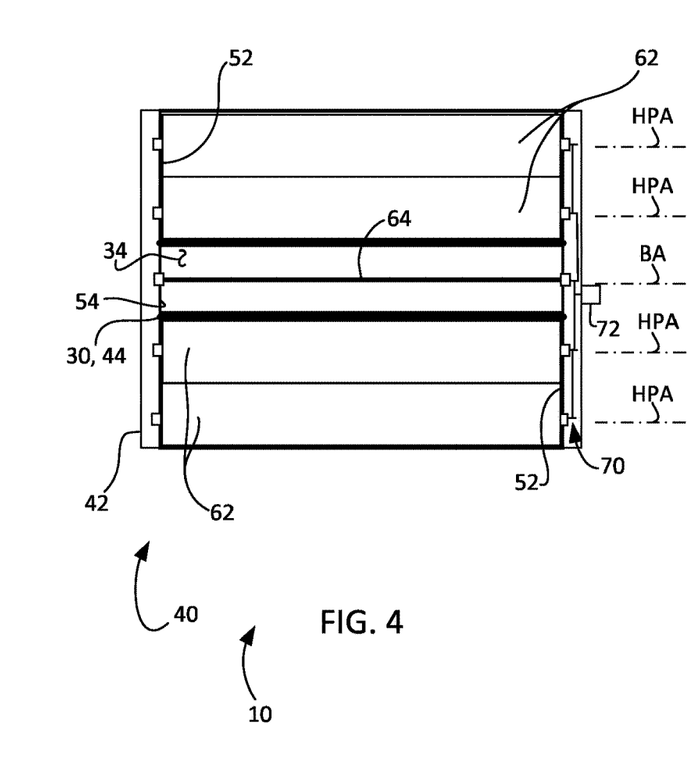
FIG. 4 is a schematic elevation similar to FIG. 3, but the damper assembly is shown in the bypass configuration.
Figure 5:
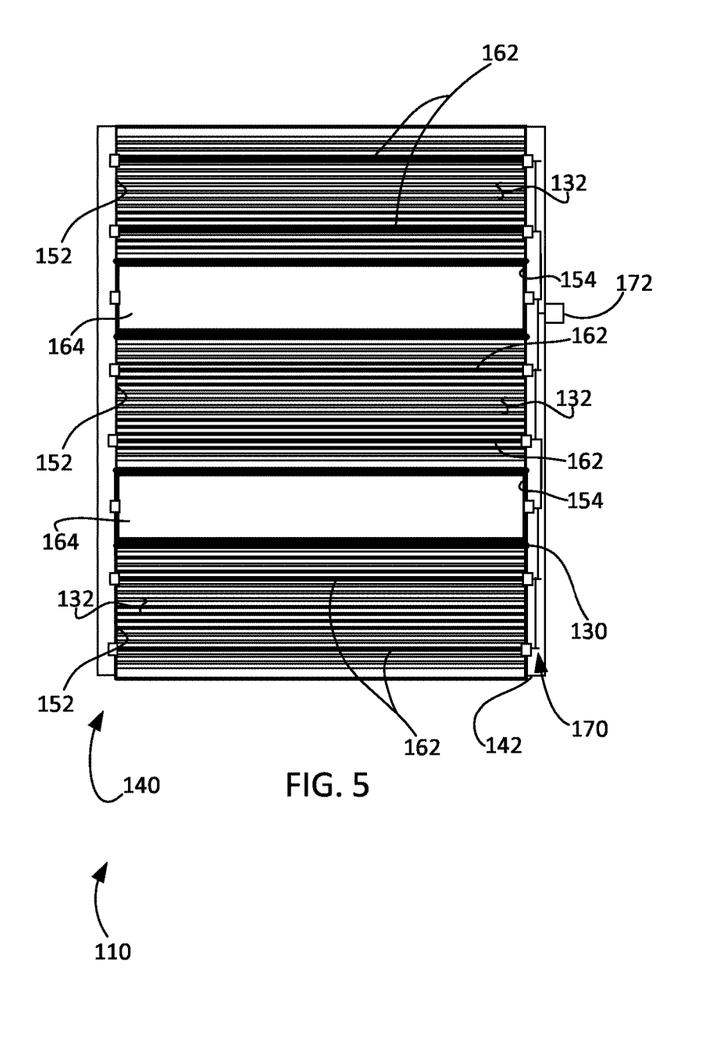
FIG. 5 is a schematic elevation similar to FIG. 3 of another embodiment of a heat exchanger showing a damper assembly thereof in a heat exchange configuration.
Figure 6:
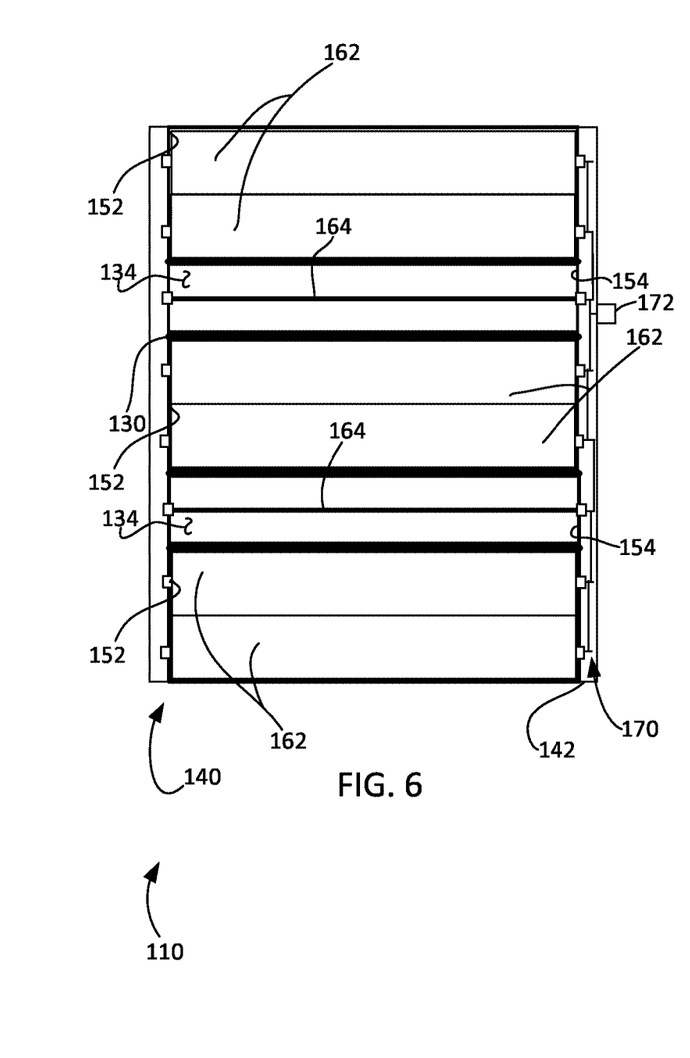
FIG. 6 is a schematic elevation similar to FIG. 5, but showing the damper assembly in a bypass configuration.
Figure 7:
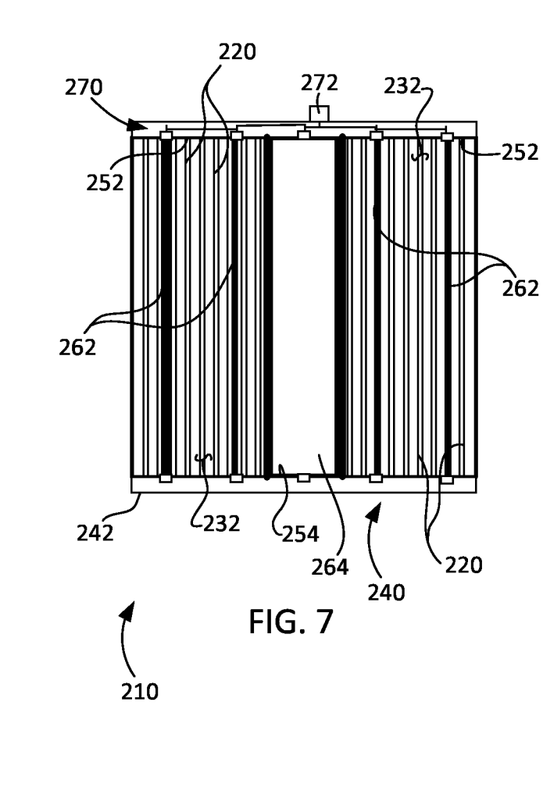
FIG. 7 is a schematic elevation similar to FIG. 3 of another embodiment of a heat exchanger showing a damper assembly thereof in a heat exchange configuration.
Figure 8:
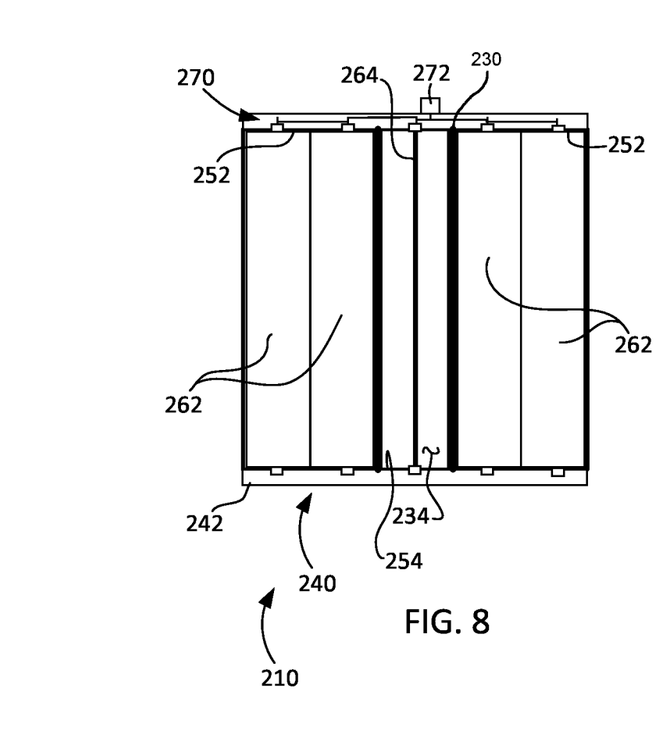
FIG. 8 is a schematic elevation similar to FIG. 7, but showing the damper assembly in a bypass configuration.

Referring to FIGS. 3 and 4, in the illustrated embodiment, each plenum 32, 34 has an elongate rectangular cross-sectional shape having a length extending generally horizontally along the width of the duct D and a shorter height extending generally vertically along the height of the duct. The cross-sectional length of each plenum 32, 34 is about the same, but in the illustrated embodiment, the cross-sectional height of the bypass plenum 34 is less than (e.g., about half) the height of each heat pipe plenum 32. In one or more embodiments, a divider can divide a duct portion into other numbers and arrangements of plenums. For example, FIGS. 5 and 6 illustrate a heat exchanger 110 comprising a divider 130 that divides the portions of the duct into three heat pipe plenums 132 and two bypass plenums 134 interleaved between the heat pipe plenums. FIGS. 7 and 8 illustrate a heat exchanger 210 comprising a divider 230 that divides the portion of the duct into first and second heat pipe plenums 232 and a bypass plenum 234 that have vertically elongate cross sectional shapes and are arranged in side-by-side relation.

Referring to FIGS. 1-4, the heat exchanger 10 further comprises a damper assembly 40. The illustrated damper assembly is mounted across the upstream duct portion, at the upstream end of the evaporator portion 12 of the heat pipe system 11. In another embodiment, a damper assembly could be mounted across the downstream duct portion, at the upstream end of the condenser portion 14 of the heat pipe, in lieu of or in addition to the upstream damper assembly 40. In general, the damper assembly 40 is selectively adjustable between a heat exchange configuration (FIGS. 1 and 3) in which the damper assembly permits air flow through the heat pipe plenums 32 and restricts air flow through the bypass plenum 34 and a bypass configuration (FIGS. 2 and 4) in which the damper assembly restricts air flow through the heat pipe plenums and permits air flow through the bypass plenum.

The illustrated damper assembly 40 comprises a frame 42 extending in a damper assembly plane DP (FIGS. 1 and 2). The frame 42 has an interior and at least one divider 44 separating one or more heat pipe sections 52 of the interior from one or more bypass sections 54. In the illustrated embodiment, the divider 44 divides the interior of the frame into upper and lower heat pipe sections 52 and a bypass section 54 located between the upper and lower heat pipe sections. The frame 42 is installed in the ventilation system such that the upper and lower heat pipe sections 52 are aligned with the upper and lower heat pipe plenums 32 and the bypass section 54 is aligned with the bypass plenum 34. The upper and lower heat pipe sections 52 provide fluid communication between an upstream portion of the duct D and the upper and lower heat pipe plenums 32, and the bypass section 54 provides fluid communication between the upstream end portion of the duct and the bypass plenum 34. It will be understood that a damper assembly frame can comprise a divider having other configurations for aligning sections of the interior with other arrangements of heat pipe and bypass plenums (see, e.g., FIGS. 5 and 6, in which the damper assembly 140 comprises a frame 142 having an interior divided into three heat pipe sections 152 and two bypass sections 154 interleaved between the heat pipe sections; and FIGS. 7 and 8, in which the damper assembly 240 comprises a frame 242 having an interior divided into heat pipe sections 252 and a bypass section 254 that have vertically elongate rectangular shapes in cross-section and are arranged in side-by-side relation). In the embodiment shown in FIGS. 1-4, the frame divider 44 is formed separately from the duct divider 30 such that the damper assembly 40 can be installed in the ventilation system V as a separate module from the heat pipe system 11. In another embodiment, the damper assembly is an integral component of the heat pipe system and the frame divider and the duct divider can comprise integrally formed duct(s) and/or partition walls.

The damper assembly 40 further comprises at least one heat pipe louver 62 rotatably mounted on the frame in alignment with each heat pipe plenum 32 and at least one bypass louver 64 rotatably mounted on the frame in alignment with each bypass plenum 34. In the illustrated embodiment, the damper assembly 40 comprises, in each heat pipe section 52, two vertically spaced heat pipe louvers 62 that are rotatable with respect to the frame about a respective heat pipe louver rotational axes HPA (FIGS. 3 and 4). Each heat pipe louver rotational axis HPA is oriented generally parallel to the damper assembly plane DP. The heat pipe louvers 62 are configured to rotate about the rotational axes HPA between respective open positions (FIGS. 1 and 3) and closed positions (FIGS. 2 and 4). In the open positions, the heat pipe louvers 62 are oriented to permit air flow through the respective heat pipe section 52 and thereby permit air flow through the heat pipe plenums 32. In the closed position, the heat pipe louvers 62 block air flow through the respective heat pipe sections 52 and thereby block air flow through the heat pipe plenums 32. The illustrated damper assembly 40 further comprises a single bypass louver 64 in the bypass section 54 that is rotatable with respect to the frame 42 about a generally horizontal bypass louver rotational axis BA. The bypass louver rotational axis BA is oriented generally parallel to the damper assembly plane DP and is oriented generally parallel to the heat pipe louver rotational axes HPA. The bypass louver 64 is rotatable about the rotational axis BA between a closed position (FIGS. 1 and 3) and an open position (FIGS. 2 and 4). In the closed position, the bypass louver 64 blocks air flow through the respective bypass section 54 and thereby blocks air flow through the bypass plenum 34. In the open position, the bypass louver 64 is oriented to permit air flow through the bypass section 54 and thereby permits air flow through the bypass plenum 34.

It will be appreciated that the damper assembly can have other arrangements of louvers without departing from the scope of the invention. For example, FIGS. 5 and 6 illustrate a damper assembly 140 comprising greater numbers of heat pipe dampers 162 and bypass dampers 164. Further, it is expressly contemplated that the number and size of louvers in each section of the frame interior can vary from what is shown. Further, as shown in FIGS. 7 and 8, in one or more embodiments a damper assembly 240 can comprise heat pipe dampers 262 and bypass dampers 264 that are configured to rotate with respect to a frame 242 about respective vertical rotational axes.

Referring again to FIGS. 3 and 4, in one or more embodiments, the damper assembly 40 comprises a linkage 70 that connects each heat pipe louver 62 and each bypass louver 64 (see also the linkage 170 of the damper assembly 140 in FIGS. 5 and 6, as well as the linkage 270 of the damper assembly 240 in FIGS. 7 and 8, each of which will be understood to function similarly to the linkage 70 shown in FIGS. 3 and 4). The linkage 70 is generally configured to connect the louvers 62, 64 together for simultaneous rotation. For example, whenever any one of the louvers 62, 64 rotates about the respective rotational axis HPA, BA, the linkage drives all of the other louvers to rotate simultaneously about the respective axes. Suitably, the linkage 70 is configured to simultaneously move the louvers 62, 64 through a range of motion that includes the heat exchange configuration (FIGS. 1 and 3)—in which the heat pipe louvers are open and the bypass louver is closed—and the bypass configuration (FIGS. 2 and 4)—in which the heat pipe louvers are closed and the bypass louver is open. As shown in FIGS. 1 and 2, in both the heat exchange configuration and the bypass configuration, the linkage 70 orients each heat pipe louver 62 at a respective phase offset angle α with respect to each bypass louver 64. In one or more embodiments, the phase offset angle α is in an inclusive range of from about 60° to about 120° (e.g., about 90° in each of the heat exchange configuration and the bypass configuration of the damper assembly 40.

In one or more embodiments, the linkage 70 drives rotation of all of the louvers, 62, 64 about the respective axes HPA, BA in the same direction. For example, when one louver 62, 64 is rotated in the counter-clockwise direction from the position shown in FIG. 1, all of the other louvers simultaneously rotate in the same direction. In these embodiments, the linkage 70 is configured to maintain each heat pipe louver 62 at a substantially constant phase offset angle α with respect to each bypass louver 64 throughout the range of motion. In another embodiment, the linkage can be configured to drive movement of the louvers such that at least some of the louvers rotate in counter-rotational directions. Various types of linkages can be used without departing from the scope of the invention. For example, in one more embodiments, the linkage comprises a bar linkage including a plurality of rocker arms that rotate the louvers through the range of motion. In another embodiment, the linkage can comprise a belt or chain that is connected to the louvers by gears or wheels. Still other types of linkages can be used without departing from the scope of the invention.

In the illustrated embodiment, the damper assembly 40 comprises a single actuator 72 (e.g., a damper motor) that is operably connected to the linkage 70 to actuate the linkage to move the louvers 62, 64 through the range of motion (see also the single actuators 172, 272 of FIGS. 5 and 6 and FIGS. 7 and 8, respectively, which are respectively operably connected to the linkages 170, 270 and will be understood to function in a similar manner to the actuator 72 shown in FIGS. 1-4). The linkage 70 thus operably connects the single actuator 72 to each of the heat pipe louvers 62 and each of the bypass louvers 64. The actuator 72 is configured to perform a first actuation operation in which the actuator adjusts the damper assembly 40 from the heat exchange configuration to the bypass configuration and a second actuation operation in which the actuator adjusts the damper assembly from the bypass configuration to the heat exchange configuration. For example, during the first actuation operation, the single actuator 72 simultaneously rotates each heat pipe louver 62 about the respective rotational axis HPA from the open position to the closed position and rotates each bypass louver 64 about the rotational axis BA from the closed position to the open position. During the second actuation operation, the single actuator 72 simultaneously rotates each heat pipe louver 62 about the respective rotational axis HPA from the closed position to the open position and rotates each bypass louver 64 about the rotational axis BA from the open position to the closed position.

During use of the heat exchanger 10, the damper assembly 40 can be used to selectively disable the heat exchanger or reduce the amount of heat exchange provided by the heat exchanger. This may be useful to prevent excessive reheating of the air that is cooled by the cooling element C. In one or more embodiments, the heat exchange configuration shown in FIGS. 1 and 3 is the default configuration of the damper assembly 40. In this configuration, the damper assembly 40 directs warm supply air to flow through the heat pipe plenums 32, where heat is transferred from the warm supply air to the refrigerant in the evaporator portion 12 of the heat pipe system 11, causing the refrigerant to evaporate and pre-cooling the supply air before it flows through the cooling element C. The cooling element C overcools the air, thereby removing humidity from the air, and the overcooled air then flows through the condenser section 14 of the heat pipe system 11, where heat from the condensed refrigerant vapor is transferred to the overcooled air to reheat the air, thereby reducing the relative humidity of the air. But in some circumstances (e.g., under certain environmental conditions), the heat exchanger 10 may provide an excessive amount of reheating of the overcooled air.

In one or more embodiments, a controller (not shown) determines whether an amount of reheat provided by the heat exchanger is excessive. When the controller determines that the amount of reheat provided by the heat exchanger 10 is excessive, the controller automatically directs the single actuator 70 to perform the first actuation operation, simultaneously closing the heat pipe louvers 62 and opening the bypass louver 64. The damper assembly 40 is thus adjusted to the bypass configuration. In the bypass configuration (FIGS. 2 and 4), the heat pipe louvers block the warm supply air from flowing through the heat pipe plenums 32. The damper assembly 40 instead directs the warm supply air to flow through the bypass plenum 34. This disrupts the evaporation of the refrigerant in the evaporator portion 12 of the heat pipe system 11, which in turn disrupts the condensation of the refrigerant in the condenser portion 14. Disrupting the refrigeration cycle in this way effectively disables (or at least greatly reduces the heat exchange capacity of) the heat exchanger 10, and thus prevents the heat exchanger from excessively reheating the air after it is cooled by the cooling element C. When conditions change such that the heat exchanger would no longer provide excessive reheat when enabled, the controller directs the single actuator 70 to perform the second actuation operation and thereby adjusts the damper assembly 40 from the bypass configuration to the heat exchange configuration.

In the above-described method of using the damper assembly, the controller operates the damper assembly in a generally binary fashion. It is also contemplated that a controller could utilize a proportional control scheme to control the damper assembly, for example, by partially opening the heat pipe louvers and bypass louvers by different amounts to adjust the amount of reheat provided by the heat exchanger. Further it is contemplated that a user can manually control the actuator to adjust the damper assembly in one or more embodiments.

It can be seen that the damper assembly 40 provides a mechanism for preventing a wraparound heat pipe heat exchanger 10 from excessively reheating cooled air in a ventilation system V. More broadly, the damper assembly 40 provides a mechanism for selectively reducing the heat exchange provided by a passive heat pipe system 11. By blocking air flow over the heat pipe sections 20 of the evaporator portion 12 and instead directing air flow through a bypass plenum 34, the damper assembly 40 can substantially disable the heat pipe system 11 in the bypass configuration. Furthermore, by locating the bypass plenum 34 between the heat pipe plenums 32, the heat exchanger 10 provides a centrally located bypass passage, which may reduce backpressure and head loss in comparison with bypass plenums located at the cross-sectional side or end of a heat pipe portion. Still further, the use of single actuator 70 is thought to reduce maintenance and repair in comparison with a damper assembly that uses separate actuators for bypass dampers and dampers that directly oppose sections of the heat pipe system.

When introducing elements of the present invention or the preferred embodiment (s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A heat exchanger for exchanging heat between first and second duct portions of a ventilation system, the heat exchanger comprising:
    a divider that is configured to be installed in the ventilation system in the first duct portion to divide the first duct portion into at least a first heat pipe plenum, a second heat pipe plenum, and a bypass plenum;
    a heat pipe system comprising a refrigerant, the heat pipe system including a first heat pipe portion and a second heat pipe portion that is configured to be fluidly connected to the first heat pipe portion such that the refrigerant can flow through the heat pipe system between the first heat pipe portion and the second heat pipe portion, the first heat pipe portion being configured to be installed in the ventilation system so that at least one heat pipe segment of the first heat pipe portion is located in each of the first and second heat pipe plenums such that heat is transferrable between the first heat pipe portion and air flowing through the first and second heat pipe plenums, the bypass plenum being free of any heat pipe segments of the heat pipe system, the second heat pipe portion being configured to be installed in the ventilation system such that heat is transferrable between the second heat pipe portion and air flowing through the second duct portion; and
    a damper assembly configured to be mounted across the first duct portion and configured to be selectively adjusted between a heat exchange configuration in which the damper assembly permits air flow through the first and second heat pipe plenums and restricts air flow through the bypass plenum and a bypass configuration in which the damper assembly permits air flow through the bypass plenum and restricts air flow through the first and second heat pipe plenums;
    wherein the bypass plenum is located between the first and second heat pipe plenums.

2. A heat exchanger as set forth in claim 1, wherein the first heat pipe plenum is located above the bypass plenum and the second heat pipe plenum is located below the bypass plenum.

3. A heat exchanger as set forth in claim 2, wherein each heat pipe segment of the first heat pipe portion extends generally horizontally.

4. A heat exchanger as set forth in claim 1, wherein the first and second heat pipe plenums and the bypass plenum are arranged in side-by-side relation and each heat pipe segment of the first heat pipe portion extends generally vertically.

5. A heat exchanger as set forth in claim 1, wherein the bypass plenum comprises a first bypass plenum and the divider further divides the first duct portion into a third heat pipe plenum and a second bypass plenum, at least one heat pipe segment of the first heat pipe portion being located in the third heat pipe plenum and the second bypass plenum being free of any heat pipe segment of the heat pipe system, the first and second bypass plenums being interleaved between the first, second, and third heat pipe plenums.

6. A heat exchanger as set forth in claim 1, wherein the damper assembly comprises a single actuator configured to adjust the damper assembly between the heat exchange configuration and the bypass configuration.

7. A heat exchanger as set forth in claim 1, wherein the damper assembly comprises a frame, the damper assembly further comprising at least one heat pipe louver movably mounted on the frame for alignment with each of the first and second heat pipe plenums and at least one bypass louver movably mounted on the frame for alignment with the bypass plenum.

8. A heat exchanger as set forth in claim 7, wherein the damper assembly further comprises a linkage that connects each heat pipe louver and each bypass louver such that the linkage drives simultaneous movement of the louvers with respect to the frame in response to movement of any of the louvers.

9. A heat exchanger as set forth in claim 8, wherein each heat pipe louver is oriented at a phase offset angle with respect to each bypass louver and each phase offset angle is in an inclusive range of from about 60° to about 120° in each of the heat exchange configuration and the bypass configuration of the damper assembly.

10. A heat exchanger as set forth in claim 1, wherein the heat pipe system comprises a wraparound heat pipe system.

* * * * *